(12) United States Patent
Adelson et al.

(10) Patent No.: US 10,574,944 B2
(45) Date of Patent: Feb. 25, 2020

(54) CONTINUOUS CONTACT-BASED THREE-DIMENSIONAL MEASUREMENT

(71) Applicant: GelSight, Inc., Waltham, MA (US)

(72) Inventors: Edward H. Adelson, Winchester, MA (US); Micah K. Johnson, West Roxbury, MA (US); Janos Rohaly, Concord, MA (US)

(73) Assignee: GelSight, Inc., Waltham, MA (US)

( * ) Notice: Subject to any disclaimer, the term of this patent is extended or adjusted under 35 U.S.C. 154(b) by 312 days.

(21) Appl. No.: 14/201,835

(22) Filed: Mar. 8, 2014

(65) Prior Publication Data

US 2014/0253717 A1 Sep. 11, 2014

Related U.S. Application Data

(60) Provisional application No. 61/774,953, filed on Mar. 8, 2013.

(51) Int. Cl.
*H04N 7/18* (2006.01)

(52) U.S. Cl.
CPC .................................. *H04N 7/183* (2013.01)

(58) Field of Classification Search
CPC ............ B65H 2220/02; B65H 2220/03; B65H 2220/01; B65H 2511/11; B65H 2513/10; B65H 2513/11; B65H 2513/21; B65H 2515/31; B65H 2553/42; B65H 19/28; B65H 75/28; B65H 2220/11; B65H 2515/30; B65H 2301/542; B65H 2301/121; B65H 23/1888; B65H 2557/23; B65H 2557/50; B65H 7/14; B65H 2220/09; B65H 23/0216; B65H 2553/414; B65H 27/00; B65H 39/16; B65H 2553/412; B65H 2701/124; B65H 37/002; B65H 43/08; G01N 21/8901; G01N 21/95; G01N 2021/8472; G01N 21/88
See application file for complete search history.

(56) References Cited

U.S. PATENT DOCUMENTS

| 4,120,585 A | 10/1978 | DePalma et al. |
| 4,340,300 A | 7/1982 | Ruell |

(Continued)

FOREIGN PATENT DOCUMENTS

| CN | 1382590 | 12/2002 |
| CN | 1445099 | 10/2003 |

(Continued)

OTHER PUBLICATIONS

Begej, "Planar and Finger-Shaped Optical Tactile Sensors for Robotic Applications", IEEE Journal of Robotics and Automation, vol. 4, No. 5, Oct. 1988 , pp. 472-484.

(Continued)

*Primary Examiner* — Dave Czekaj
*Assistant Examiner* — Samuel D Fereja
(74) *Attorney, Agent, or Firm* — Strategic Patents, P.C.

(57) ABSTRACT

Continuous measurement of surfaces larger than a sensor is facilitated by the use of a sensor matrix of a clear elastomer and a reflective surface that scrolls, rolls, or otherwise moves over a target surface. A variety of web materials, camera configurations, and handling systems are described to achieve continuous three-dimensional measurement in this context.

20 Claims, 10 Drawing Sheets

(56) References Cited

U.S. PATENT DOCUMENTS

| | | | |
|---|---|---|---|
| 4,481,815 A | | 11/1984 | Overton |
| 4,549,093 A | | 10/1985 | Severwright |
| 4,584,625 A | | 4/1986 | Kellogg |
| 4,588,348 A | | 5/1986 | Beni et al. |
| 4,760,945 A | | 8/1988 | Zerle |
| 4,775,961 A | | 10/1988 | Capek et al. |
| 5,357,799 A | | 10/1994 | Roth et al. |
| 5,448,649 A | | 9/1995 | Chen et al. |
| 5,459,329 A | | 10/1995 | Sinclair |
| 5,616,839 A | * | 4/1997 | Chen .................. G01M 17/027 356/71 |
| 5,737,071 A | | 4/1998 | Arndt |
| 5,767,980 A | * | 6/1998 | Wang .................. B41F 33/0036 358/475 |
| 5,967,940 A | | 10/1999 | Yamaguchi |
| 5,967,990 A | | 10/1999 | Thierman et al. |
| 6,118,132 A | * | 9/2000 | Tullis .................... G01B 11/16 250/208.1 |
| 6,144,757 A | | 11/2000 | Fukuzumi |
| 6,234,031 B1 | * | 5/2001 | Suga .................... G06K 9/0002 73/862.474 |
| 6,369,588 B1 | | 4/2002 | Sleefe et al. |
| 6,566,670 B1 | * | 5/2003 | Buisker .............. B65H 23/0216 250/559.36 |
| 6,909,084 B2 | | 6/2005 | Tachi et al. |
| 7,707,001 B2 | | 4/2010 | Obinata et al. |
| 2001/0050765 A1 | | 12/2001 | Antonelli ........... G06K 9/00046 356/71 |
| 2002/0071115 A1 | * | 6/2002 | Batchelder ............... G01N 1/02 356/237.1 |
| 2003/0053139 A1 | * | 3/2003 | McKim ................... B65C 1/025 358/300 |
| 2003/0112439 A1 | * | 6/2003 | Nettekoven ........ G01N 21/8901 356/430 |
| 2003/0116725 A1 | * | 6/2003 | Sorebo .............. B65H 23/0216 250/559.36 |
| 2003/0178556 A1 | | 9/2003 | Tachi et al. |
| 2004/0057046 A1 | * | 3/2004 | Abbott ................. G01N 21/896 356/239.1 |
| 2004/0237669 A1 | | 12/2004 | Hayward et al. |
| 2004/0252867 A1 | | 12/2004 | Lan et al. |
| 2004/0255128 A1 | | 12/2004 | Ohba |
| 2005/0208295 A1 | * | 9/2005 | Saika ...................... C12Q 1/06 428/343 |
| 2006/0119837 A1 | | 6/2006 | Raguin et al. |
| 2006/0237156 A1 | * | 10/2006 | Shakespeare ...... G01N 21/8806 162/198 |
| 2007/0014886 A1 | * | 1/2007 | Hennessey ............ B29C 43/222 425/471 |
| 2007/0146536 A1 | | 6/2007 | Lemoine |
| 2007/0288186 A1 | | 12/2007 | Datta et al. |
| 2008/0106258 A1 | * | 5/2008 | Torres-Jara ............. G01L 5/226 324/207.2 |
| 2008/0219521 A1 | | 9/2008 | Benkley et al. |
| 2008/0284925 A1 | | 11/2008 | Han |
| 2008/0297861 A1 | * | 12/2008 | Noffke ................ B41F 33/0036 358/509 |
| 2009/0315989 A1 | * | 12/2009 | Adelson ............... A61B 5/1172 348/135 |
| 2010/0132569 A1 | | 6/2010 | Yumoto et al. |
| 2010/0284565 A1 | | 11/2010 | Benkley et al. |
| 2010/0304338 A1 | | 12/2010 | Cramer et al. |
| 2011/0141269 A1 | * | 6/2011 | Varga ................. G01N 21/8903 348/92 |
| 2012/0162371 A1 | | 6/2012 | Ota et al. |
| 2013/0033595 A1 | * | 2/2013 | Adelson ............... A61B 5/0077 348/92 |
| 2013/0070074 A1 | * | 3/2013 | Won ........................ G01L 1/247 348/77 |
| 2013/0113919 A1 | * | 5/2013 | Qiao ........................ H04N 7/18 348/92 |
| 2014/0204383 A1 | * | 7/2014 | Sopori ............... G01N 21/8901 356/416 |
| 2015/0253487 A1 | * | 9/2015 | Nichol ................. G02B 6/0036 362/610 |

FOREIGN PATENT DOCUMENTS

| | | |
|---|---|---|
| JP | 2005121858 | 5/2005 |
| JP | 2007520040 | 7/2007 |
| JP | 2008008746 | 1/2008 |
| WO | WO-2005085766 | 11/2005 |
| WO | WO-2006098719 | 9/2006 |
| WO | WO-2006115553 | 11/2006 |
| WO | WO-2014138716 | 9/2014 |

OTHER PUBLICATIONS

Maekawa, et al., "Development of a Finger-Shaped Tactile Sensor and its Evaluation by Active Touch", Proceedings of the 1992 IEEE International Conference on Robotics and Automation, Nice, France, May 1992, pp. 1327-1334.

Maheshwari, et al., "High-Resolution Thin Film Device to Sense Texture by Touch", Science, vol. 312, Jun. 9, 2006, pp. 1501-1504.

Maheshwari, et al., "Tactile Sensors to Sense Touch on a Par with a Human Finger", Angewandte Chem. Int. Ed., 2008, pp. 7808-7826.

Graz, et al., "Flexible Ferroelectret Field-Effect Transistor for Large-Area Sensor Skins and Microphones", Applied Physics Letters, 89, 2006, pp. 073501-1-073501-3.

Heo, et al., "Tactile Sensor Arrays Using Fiber Bragg Grating Sensors", Sensors and Actuators A 126, 2006, pp. 312-327.

Noda, Kkentaro et al., "300nm-Thick Cantilever in PDMS for Tactile Sensing", 2005 IEEE, 2005, pp. 283-286.

Lee, et al., "A Modular Expandable Tactile Sensor Using Flexible Polymer", 18th IEEE International Conference 2005, 2005, pp. 642-645.

Hritsu, et al., "The Performance of a Deformable-Membrane Tactile Sensor: Basic Results on Geometrically-Defined Tasks", IEEE International Conference on Robotics and Automation 2000, 2000, pp. 508-513.

Johnson, et al., "Retrographic Sensing for the Measurement of Surface Texture and Shape", Computer Vision and Pattern Recognition, 2009. IEEE Conference on, IEEE, Piscataway, NJ, USA, Jun. 20, 2009, pp. 1070-1077.

O'Gorman, et al., "Fingerprint Verification", Chapter 2, Biometrics: Personal Identification in Networked Society, 1999, pp. 1-22.

Kajimoto, et al., "Active Tactile Sensor using Deformable Sheet Reflector", Technical Digest of the 16th Sensor Symposium 1998, 1998, pp. 99-104.

Full, et al., "Maximum Single Leg Force Production: Cockroaches Righting on Photoelastic Gelatin", The Journal of Experimental Biology 198, 1995, pp. 2441-2452.

Johnson, et al., "Surface Metrology using an Elastomeric Sensor", Imaging and Applied Optics Technical Digest, Jul. 10, 2011, 3 pages.

Adelson, et al., "Visualizing and Measuring Detailed Shape and Texture with an Elastomeric Sensor", Imaging and Applied Optics Technical Digest, Jul. 10, 2011, 3 pages.

Johnson, et al., "Microgeometry Capture using an Elastomeric Sensor", ACM Transactions on Graphics, vol. 30, No. 4, Jul. 1, 2011, 1 page.

"International Application Serial No. PCT/US14/22196, Search Report and Written Opinion dated Sep. 14, 2012", pp. 1-12.

WIPO, "International Application Serial No. PCT/US14/22196, Preliminary Report on Patentability dated Sep. 17, 2015", 9 pages.

SIPO, "CN Application No. 201480025854.3 Office Action dated Jul. 28, 2016", English Translations, 15 pages.

* cited by examiner

CONTINUOUS CONTACT-BASED THREE-DIMENSIONAL MEASUREMENT

CROSS-REFERENCE TO RELATED APPLICATIONS

This application claims the benefit of U.S. Provisional Application No. 61/774,953 filed on Mar. 8, 2013.

This application is also related to U.S. patent application Ser. No. 12/488,008 filed on Jun. 19, 2009, which claims priority to U.S. Provisional Application No. 61/073,904 filed on Jun. 19, 2008. This application is also related to U.S. patent application Ser. No. 13/561,712 filed on Jul. 30, 2012, which claims priority to U.S. Provisional Application No. 61/512,680 filed on Jul. 28, 2011.

The entire content of each of the above applications is hereby incorporated by reference in its entirety.

BACKGROUND OF THE INVENTION

The invention generally relates to tactile sensors, and, more specifically, to tactile sensor systems that provide continuous measurement over objects having surface areas larger than the sensor contact area.

U.S. patent application Ser. No. 12/488,008 filed on Jun. 19, 2009, discloses a tactile sensor includes a photosensing structure, a volume of elastomer capable of transmitting an image, and a reflective skin covering the volume of elastomer. The reflective skin is illuminated through the elastomer by one or more light sources, and reflects light back toward the photosensing structure. The reflective skin and underlying elastomer can conform to a target surface during contact. The resulting geometrical alterations cause localized changes in the surface normal of the reflective skin, resulting in similarly localized changes in the amount of light reflected from the reflective skin in the direction of the photosensing structure. These variations in light intensity encode three-dimensional data for the measured surface, which can be calculated as surface normals, a gradient map, a three-dimensional surface map, or any other suitable representation.

While techniques exploiting the properties of such a system are generally described in the applications described above, there remains a need for adaptations of this technique to facilitate the continuous capture of surface data over surfaces larger than the surface area of the tactile sensor.

SUMMARY

Continuous measurement of surfaces larger than a sensor is facilitated by the use of a sensor matrix of a clear elastomer and a reflective surface that scrolls, rolls, or otherwise moves over a target surface. A variety of web materials, camera configurations, and handling systems are described to achieve continuous three-dimensional measurement in this context.

In one aspect, a device disclosed herein includes a source of a web material, the web material being an elastomeric material adapted to conform to an object during contact; a roller configured to press the target surface against the web material, thereby providing an impression of the target surface in the web material; an imaging system including a camera with a field of view and a light source configured to illuminate the field of view; a spooling system configured to draw the web material from the source through the roller to the imaging system; and a controller configured to operate the spooling system to position the impression within the field of view and to capture one or more images of the impression in the web material using the imaging system.

The roller may press the target surface against the web material with a predetermined contact force. The roller may press the target surface against the web material with a predetermined contact angle. The light source may be configured to provide a grazing illumination of the impression. The camera may capture a plurality of images, each one of the images may be illuminated with the grazing illumination from a different direction. The web material may be a curable material.

The device may include a curing system that may be configured to cure the web material in a manner that permits the web material to retain the impression as the web passes from the roller to the imaging system. The device may further include a processor configured to obtain a three-dimensional image using the one or more images. The device may include a processor configured to obtain at least one of a surface gradient and a normal map for the target surface. The device may include a light source positioned to illuminate the impression in the field of view.

The web material may include a silicone. The silicone may be an ultraviolet light curable silicone. The device may further include an ultraviolet light source positioned to cure the web along a path from the source to the imaging system. The web material may include a web of a base material and a web of a catalyst that may be combined to initiate curing as the base material and the catalyst are provided from the source. The web material may be semi-transparent and the imaging system may include a back light to illuminate the web material from a surface opposite the camera. The web material may be a composite material including a clear elastomer on a first side away from the target surface and an opaque, reflective material on a second side adjacent to the target surface. The roller and the source of web material may be configured to continuously capture an impression as the target surface passes the roller.

In another aspect, a method disclosed herein includes providing a source of a web material including an elastomeric material adapted to conform to an object during contact; continuously passing the web material from the source over a target surface; applying a force to press the web material onto the target surface, thereby creating an impression of the target surface in the web material; feeding the web material from the target surface to an imaging system; and capturing an image of the impression.

The web material may be a curable web material and the method may further include curing the web material to retain the impression after contact with the target surface. The curable web material may be an ultraviolet curable material. The web material may be a composite material that includes a clear elastomer oriented distal from the target surface and a reflective surface oriented proximal to the target surface. Capturing an image may include capturing a three-dimensional image from one or more images of the impression in the web material. The method may further include forming the web material by laminating a web of a base material and a web of a catalyst to initiate curing of the base material by the catalyst. The web material may be semi-transparent and the method may include backlighting the impression to capture the image. The method may include applying an ink of reflective material to a substrate of clear elastomer to form the web material.

In another aspect, a device disclosed herein includes a camera and a light source; a clear support fixture having a first surface facing the camera and a second surface facing a target surface of an object for measurement, wherein the light source and the camera are directed through the clear support fixture toward the target surface; a layer of clear elastomer adjacent to the second surface; a web of material between the layer of clear elastomer and the target surface, the web including a reflective material providing a thin, opaque surface conformable to the target surface and reflecting light on a side facing the layer of clear elastomer; and a spooling system configured to move the web along the second surface of the clear support fixture to facilitate replacement of a portion of the web adjacent to the target surface.

The clear support fixture may be a clear plate providing a rigid, planar surface facing the target surface. The clear support fixture may be movable along an axis toward the target surface. The device may further include a processor configured to calculate a three-dimensional image of the target surface based on three-dimensional data encoded in one or more images of the target surface from the camera. The layer of clear elastomer may be bonded to the web to provide a web of composite material including the clear elastomer and the reflective material.

The device may further include a lubricant between the clear support fixture and the web to facilitate movement of the web along the clear support fixture. The lubricant may include an index matching oil selected to match an optical index of the clear support fixture to an optical index of the first layer.

The layer of clear elastomer may be coupled to the second surface of the clear support fixture.

The device may include a controller configured to operate the spooling system to replace the portion of the reflective material between consecutive measurements of the target surface by scrolling the web of reflective material to position an unused portion of the web between the clear support fixture and the target surface. The controller may be configured to replace the portion of the reflective material after a predetermined number of surface measurements.

The device may further include a handling system to move an object including the target surface in order to present a different portion of a surface of the object as the target surface to the device. The device may further include a processor configured to combine a plurality of surface measurements from a plurality of surfaces of the object into a single three-dimensional image. The device may further include a processor configured to combine a plurality of surface measurements from a plurality of surfaces of the object into at least one of a surface gradient or a normal map for the plurality of surfaces. Operation of the handling system may be synchronized to operation of the spooling system to match a planar movement of the web and the target surface relative to the clear support fixture.

The clear support fixture may include a rigid cylinder, wherein the first surface faces an interior of the rigid cylinder and the second surface forms a sidewall facing an exterior of the rigid cylinder, and wherein the camera may be positioned within the rigid cylinder. The rigid cylinder may be rotatably coupled around the camera and configured to maintain the camera in a predetermined pose relative to the target surface independent of a rotation of the rigid cylinder.

The device may include a conveyer to move the object while maintaining the target surface in contact with the web. The web may be a composite material that may include a release liner and wherein the spooling system may include a roller to remove the release liner from the composite material as the web contacts the sidewall of the rigid cylinder. The spooling system may include a second roller for adding a new release liner to the composite material as the web is removed from the sidewall of the rigid cylinder. The object may be a sheet of material, the device may further include a roller opposing the rigid cylinder to maintain the sheet of material in contact with the web. The object may be a sheet of material, the device may further include a second camera, light source, support fixture, layer of elastomer, and reflective layer positioned and arranged to concurrently capture an image from an opposing surface of the sheet of material.

The device may include an applicator for applying the reflective material to the layer of clear elastomer, thereby providing the web of material as a composite web material including the reflective material and the clear elastomer. The applicator may be an ink applicator and the reflective material may be applied as an ink. The applicator may apply the reflective coating from a release liner to the clear elastomer.

In another aspect, a device disclosed herein includes a rigid cylinder having a sidewall formed of a clear material; a first layer of a clear elastomer about the sidewall; a second layer of a reflective material about the first layer, the reflective material providing a thin, opaque surface conformable to a surface external to the rigid cylinder and the reflective material reflecting light on a side facing the first layer; a camera positioned within the rigid cylinder, the rigid cylinder rotatably coupled around the camera, thereby permitting the camera to maintain a predetermined point of view of a target surface outside the rigid cylinder independent of rotation of the rigid cylinder; and a cleaning system configured to clean the second layer before the second layer comes in contact with the target surface.

In general, the clear material may include an optically clear cast acrylic. The device may include a light source positioned to provide directional illumination from within the rigid cylinder toward the predetermined point of view. The light source may be positioned inside the rigid cylinder. The device may further include a processor configured to calculate a three-dimensional shape of the target surface based upon one or more images from the camera. The processor may calculate the three-dimensional shape by estimating surface normals based upon an intensity of light reflected from the second layer.

The device may further include a contact wheel that rotatably contacts the second layer, where the contact wheel is configured to maintain a predetermined contact force against the rigid cylinder. The device may further include a feeder for feeding a sheet of material between the contact wheel and the rigid cylinder. The contact wheel may provide a rotational force to move the sheet of material between the contact wheel and the rigid cylinder. The contact wheel may rotatably contact the rigid cylinder at a location within the predetermined point of view. The device may further include a drive wheel separate from the contact wheel for imparting rotational force to the rigid cylinder. The cleaning system may include a cleaning wheel contacting the second layer at a position away from the contact wheel, the cleaning wheel including an adhesive surface selected to remove debris from the second layer. The cleaning system may include a cleaning solution applicator and a drying wheel positioned to clean and dry the second layer as the rigid cylinder rotates.

The device may further include a conveyor supporting an object in contact with the second layer, where the conveyor is configured to move the object tangentially by the rigid cylinder at a predetermined distance. The device may further include an arm coupled to the device for rolling the device across a stationary sample, wherein the first layer and the second layer may be disposed on the stationary sample.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
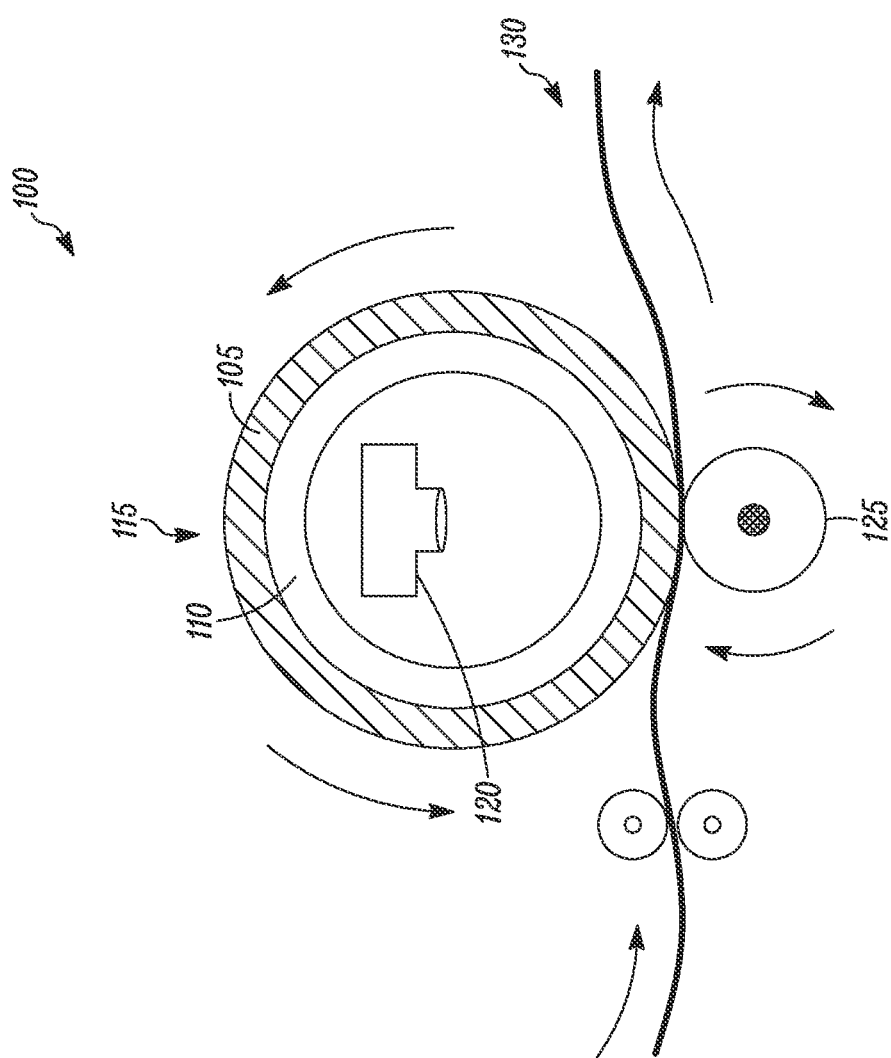
FIG. 1 is a side view of a tactile rolling sensor.

Disclosed herein are systems and methods for continuous measurement of surfaces. Preferred embodiments include methods of and systems for inspection and measurement of relative large surfaces. As used herein, "relatively large surfaces" are those surfaces or combination of surfaces of an object that have a surface area that is larger than the contact region of a sensor being used to inspect and/or measure the surface. In one aspect, a deformable sensing matrix of a clear elastomer and a reflective layer is handled independently from a camera, lighting, and a clear support fixture so that movement of the sensing matrix can be coordinated with movement of a target surface as an object moves relative to the camera. The methods and systems described herein contemplate a wide range of continuous imaging applications, and may be usefully employed for inline inspection, metrology, quality control, and so forth. For example, continuous measurement as contemplated herein is suitable for industrial applications requiring 100% inline inspection.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms.

Embodiments of the invention are useful for inspecting and measuring surface features of a variety of objects. In certain implementations, the sensors described herein can be used as part of a manufacturing process. One or more sensors can be disposed along a manufacturing line to evaluate the production of goods at any phase during the process. For example, for a multi-component object that is being assembled, a component may be inspected before being joined to other components. Similarly, the completed object may be inspected for cosmetic or other defects. In addition, the sensor systems and techniques set forth herein are suitable for evaluating manufacturing films with a microstructured, functional surface, such as optical films, abrasives with micro-replicated surfaces, and/or micro-structured paint.

In yet further implementations, the sensors described herein can be incorporated into handheld assemblies that are used by quality control personnel (either on the line or in another location) to ensure the manufactured objects are free of defects and meet production standards. In such implementations, the sensors and associated rollers may be joined to a support structure and attached to a handle, or otherwise configured for continuous, manual operation.

In the following description, numerous components are described such as rollers, handling systems, spooling systems, support fixtures, web materials, imaging systems, and so forth. It will be understood that these components may in general be used interchangeably with the various configurations and embodiments described herein, unless otherwise expressly stated or clear from the context. Thus for example, where a planar, clear rigid pressure plate is described for applying force to a target surface, this pressure plate may be used in all embodiments described, and any other clear rigid support fixture (such as a cylindrical fixture) may be used instead of the plate, unless, for example, an embodiment expressly requires, e.g., a rolling fixture.

FIG. 1 shows a side view of an implementation of a tactile rolling sensor 100. The tactile rolling sensor 100 may employ similar imaging principles to the tactile sensors disclosed in the incorporated applications, with variations as set forth herein. The tactile rolling sensor 100 may include a clear elastomer 105 supported on an outside surface of a clear rigid cylinder 110 made of, e.g., optically clear cast acrylic. A reflective membrane (or "skin") 115 may be formed on the outside surface of the elastomer 105. The reflective membrane can be formed using any of the techniques disclosed in the incorporated applications. Meanwhile, the membrane itself can be cast onto the cylinder or bound to the cylinder using a clear optical adhesive.

Ambient light or directional illumination (not shown) may pass through the cylinder 110 and the elastomer 105 and strike an inner surface of the reflective membrane 115. An imaging system 120 with one or more cameras may be disposed inside the cylinder 110 with a field of view directed toward the inner surface of the reflective membrane 115 where it contacts a target surface. The imaging system 120 may record reflected light as an image, such as a two-dimensional grayscale image. The tactile rolling sensor 100 may also include a roller 125 with a drive wheel that traps and feeds an object 130 that is to be inspected between the roller 125 and the reflective membrane 115.

When the object 130 passes between the roller 125 and reflective membrane 115, the roller 125 may apply pressure to an outer surface of the reflective membrane 115, thereby causing the membrane 115 to deform and to take an instantaneous impression of the surface topography of the object 130. This deformation changes the surface normal of the membrane 115, which leads to a change in the amount of light reflected toward and detected by the imaging system 120 at each measured location on the surface. The resulting image pattern encodes the varying local surface topography of the object 130 as a collection of surface normals, and thus encodes the shape of the surface in a manner that can be recovered, e.g., by integrating a number of individual normals across a section of the measured surface. It will be understood that multiple, directional illuminations may be provided to improve the accuracy of such measurements and calculations.

As the roller 125 rotates, the cylinder 110 may also rotate and pull different portions of the object 130 between the roller 125 and the reflective membrane 115, thereby generating a series of images. The series of images so obtained can be stitched into a single image of the entire surface of interest of the object 130 by methods known in the art, such as those used to obtain panoramic photographs from a series of smaller photographs. The measured surface normal field and/or height maps may also or instead be stitched together in a similar way.

Optionally, the cylinder 110 can remain in a fixed position while the surface of interest of the object 130 is pulled over it, or the cylinder 110 may move over a surface of the object 130 while the object 130 remains stationary.

In one aspect, the sensor 100 may be configured for concurrent, continuous imaging of two sides of the object 130. For example, where the object 130 is a sheet of material, the sensor 100 may include a second camera, light source, pressure fixture, layer of elastomer, and reflective layer positioned and arranged to concurrently capture an image from an opposing surface of the sheet of material. The second pressure fixture may advantageously be configured as a rigid cylinder replacing the roller 125 and configured to rotate synchronously with the cylinder 110 described above so that the sheet of material can be fed between the two rolling surfaces of the two opposing sensors.

Figure 2:
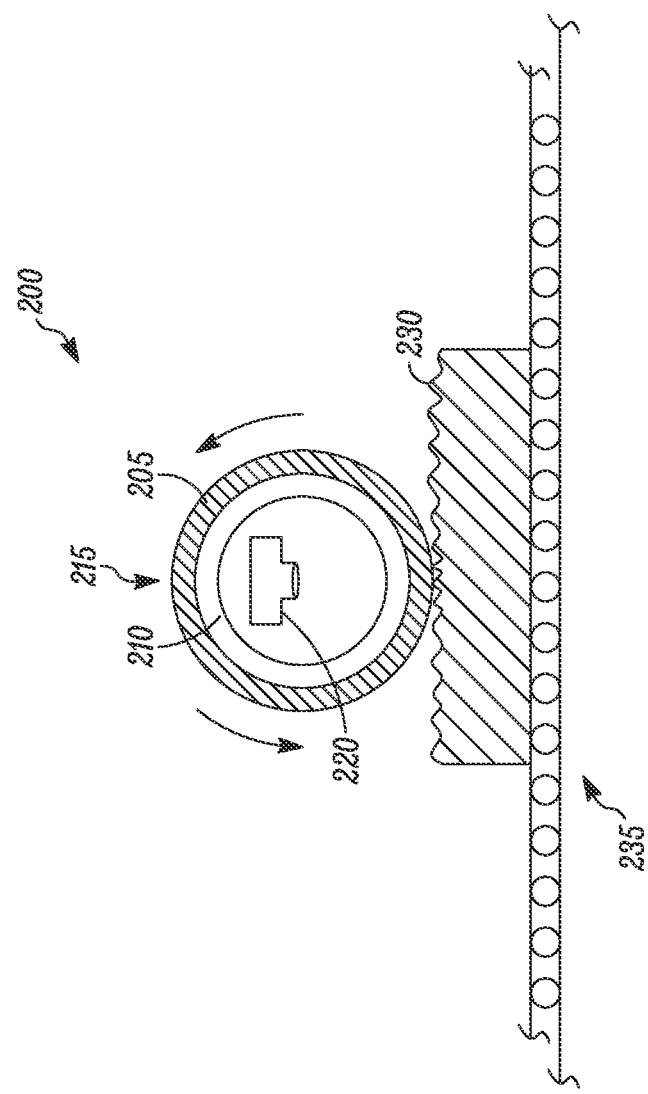
FIG. 2 shows a side view of a tactile rolling sensor with a conveyor assembly.

FIG. 2 shows a a tactile rolling sensor and conveyor assembly 200. As with sensor 100, the assembly 200 may include a clear elastomer 205 supported on an outside surface or sidewall of a clear rigid cylinder 210. A reflective membrane 215 may be formed on the outside surface of the elastomer 205. A camera 220 may be disposed inside the cylinder 210 with a field of view of the inner surface of the reflective membrane 215. The camera 220 may record reflected light as an image. The assembly 200 may also includes a handling system 235 to move an object 230 in order to present a portion of the object 230 as a target surface for imaging. In general, the handling system 235 may be synchronized to operation of a spooling system or the like so that a planar movement of a web material matches a movement of a target surface relative to a pressure fixture. In one aspect, the handling system 235 may include a conveyer to move the object 230 while maintaining a target surface of the object 230 in contact with the cylinder 210, or in contact with any of the other pressure fixtures and/or web materials described herein. The conveyer may, for example trap and feed the object 230 between the conveyor and the reflective membrane 215, or more generally support the object 230 in contact with the contact surface(s) of a cylinder 210 by moving the object tangentially past the cylinder 210 at a predetermined distance. The handling system 235 may include any of the various conveyor systems known in the art, e.g., conveyor belts, lineshaft roller conveyors, wire mesh conveyors, etc., or any other suitable conveyors, robotics, and so forth.

Figure 3:
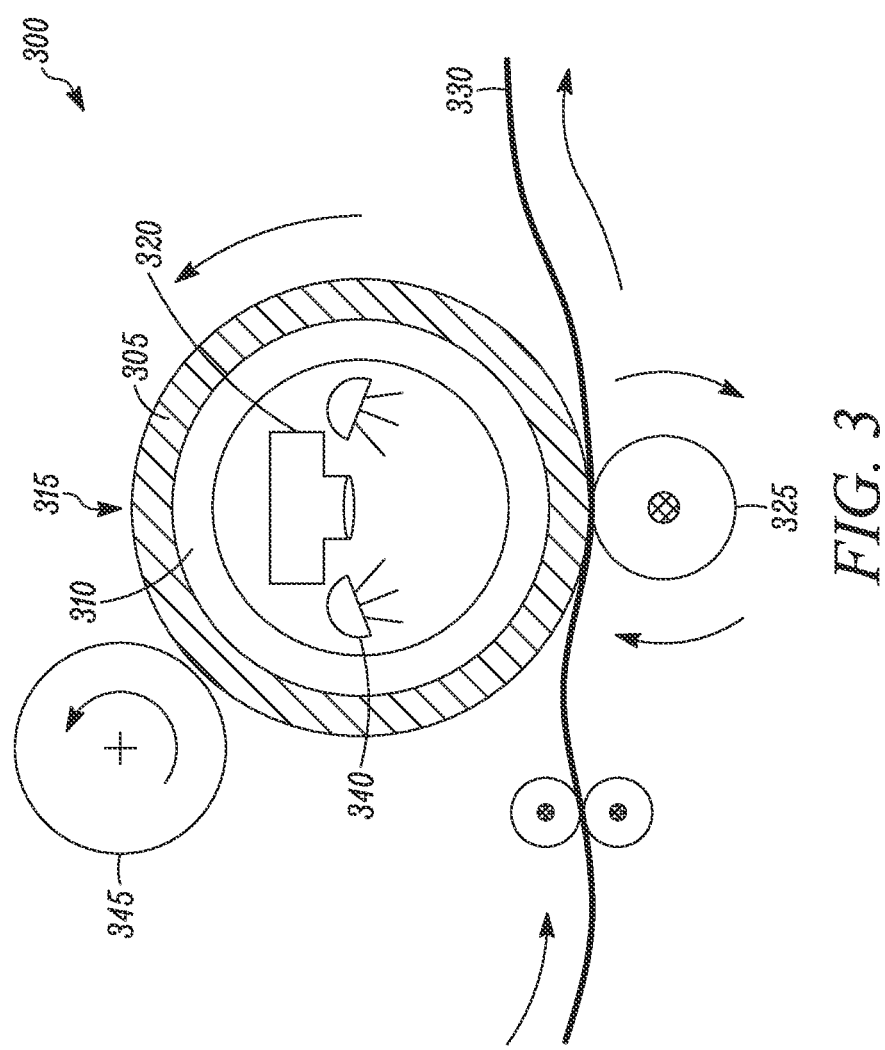
FIG. 3 shows a side view of a tactile rolling sensor.

FIG. 3 shows a side view of a tactile rolling sensor 300. As with the previous two sensors 100 and 200, the tactile rolling sensor 300 may include a clear elastomer 305 supported on an outside surface of a clear rigid cylinder 310. A reflective membrane 315 may be formed on the outside surface of the elastomer 305. A camera 320 may be disposed inside the cylinder 310 with a field of view including the inner surface of the reflective membrane 315. The camera may record reflected light as an image. Light may be provided to the inner surface of the reflective membrane 315 by a light source 340 inside the cylinder 310 or otherwise suitably positioned. The light source 340 may provide directed illumination, such as a grazing illumination of the target surface from one or more directions (e.g., from one or more lights).

The sensor 300 may also include a drive wheel 325 or other roller to support or move an object during imaging. In the alternative, the drive wheel 325 can be replaced with a conveyor as set forth above.

The tactile rolling sensor 300 may include a cleaning system 345. In general, the cleaning system 345 may be configured to clean the outer layer of the sensor 300 before it comes in contact with a target surface. For example, the cleaning system 345 may include a cleaning wheel or the like contacting the outer layer of the sensor 300 at a position away from other rollers (such as a drive wheel, contact wheel for retaining an object to be imaged, and so forth). The cleaning wheel may include an adhesive surface formed of a material selected to remove debris or the like from the outer layer. In general, this serves to remove debris from the outer layer prior to contact with a target surface in order to reduce the likelihood that the debris shows up in the image detected by the camera. The surface of the cleaning system 345 can be made "sticky" through the use of various adhesives, tapes, and/or silicone rubber compounds known in the art. The sticky surface may adhere to dust and debris on the surface of the reflective membrane 315 in order to remove that the debris from the membrane. In alternate implementations, the cleaning system 345 may use jets of air and/or mechanical brushes. The cleaning system 345 may also or instead employ a cleaning solution applied to a portion of the reflective membrane 315 followed by a drying roller to remove the liquid solution prior to contacting a target surface.

A variety of additional techniques be used either instead of or in combination with the cleaning techniques described above to mitigate measurement errors associated with debris and other surface defects. In one aspect, multiple tactile rolling sensors 300 can be disposed so as to capture multiple measurements of the same portion of the object 330. These multiple measurements can be used to effectively filter-out the effect of the contaminants (e.g., a median or average value of a surface feature can be determined). In another aspect, a number of impressions from a roller may be compared to identify surface defects. Because the surface(s) of a single roller sensor will be used to capture many images, a comparison of multiple images created from a particular portion of the roller surface can be performed to learn the position of contaminants on the surface of the membrane. In such a case, the rotational position of the reflective membrane may be tracked during sensor operation so that comparisons can be made from object to object.

Figure 4:
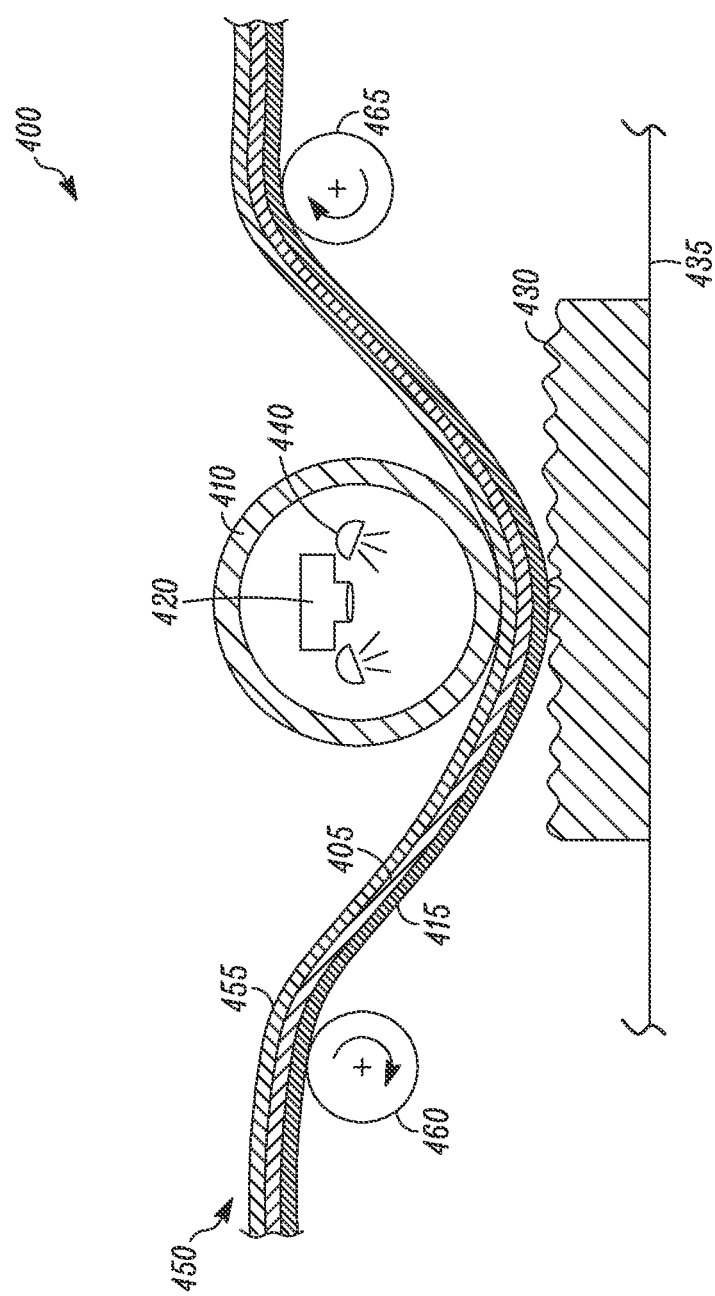
FIG. 4 shows a side view of a tactile rolling sensor with a continuously fed web of a sensing membrane.

FIG. 4 shows a side view of a tactile rolling sensor 400 with a continuously fed sensing membrane in a web material 450. The tactile rolling sensor 400 may include a clear rigid cylinder 410 inside of which is mounted a camera 420 and directed illumination 440. The web material 450 may be a multi-layer composite that is continuously fed in between an object 430 to be inspected and the cylinder 410 by rollers 460 and 465. In this embodiment, the object may be held on a conveyor 435. The web material 450 may include a reflective material 415 such as an opaque, reflective material, joined to a clear elastomer 405. The clear elastomer 405 may in turn be joined to a clear support fixture 455 such as a clear support film. In this manner, a malleable elastomer 405 may be provided on a surface contacting an object, while a more rigid material (the clear support film) may provide structural integrity to the web material 450 to facilitate handling of the web during imaging.

In one aspect, a web material 450 with a clear support film may be used to capture impressions without any other pressure fixture, e.g., by pulling the web taut over a surface of interest. In another aspect, where a layer of clear elastomer or reflective material includes an independent support structure such as reinforcing fibers or a mesh, the clear support film may be omitted. In either case, a clear rigid plate or cylinder may provide an additional supporting structure to serve as the clear support fixture 455 for the sensing matrix, or the film may serve as the clear support fixture 455.

The clear support fixture 455 may be bonded to the clear elastomer 405 with a clear adhesive or other suitable bonding technique or agent. The clear support fixture 455 may provide structural support for the elastomer 405 and membrane 415, both of which are elastomeric. The clear support fixture 455 may be constructed of a clear non-stretchy material, such as 3 mil thick polyester. The clear elastomer 405 of the sensing membrane 450 may be about 1-3 mm thick. The film thicknesses provided herein are illustrative only, as more or less thick materials remain within the scope of the invention.

The design of the tactile sensor 400 supports continuous imaging by providing a sensing matrix as a web material 450 that can move with an object 430 that is being measured so that every measurement is taken with a "fresh" or unused portion of reflective membrane 415. This avoids cross-contamination between measurements by dirt, debris, lint, etc. picked up by the sensor from the object's surface. In addition, because a new portion of membrane is used for each measurement, wear and tear of the membrane due to previous contacts with other surfaces is reduced. A supply roller holding a quantity of web material 450 (not shown), rollers 460 and 465, and a used membrane collection roller (not shown) can be included in a cartridge format that enables one to swap a used cartridge for a new cartridge when all of the web material has been used.

Figure 5:
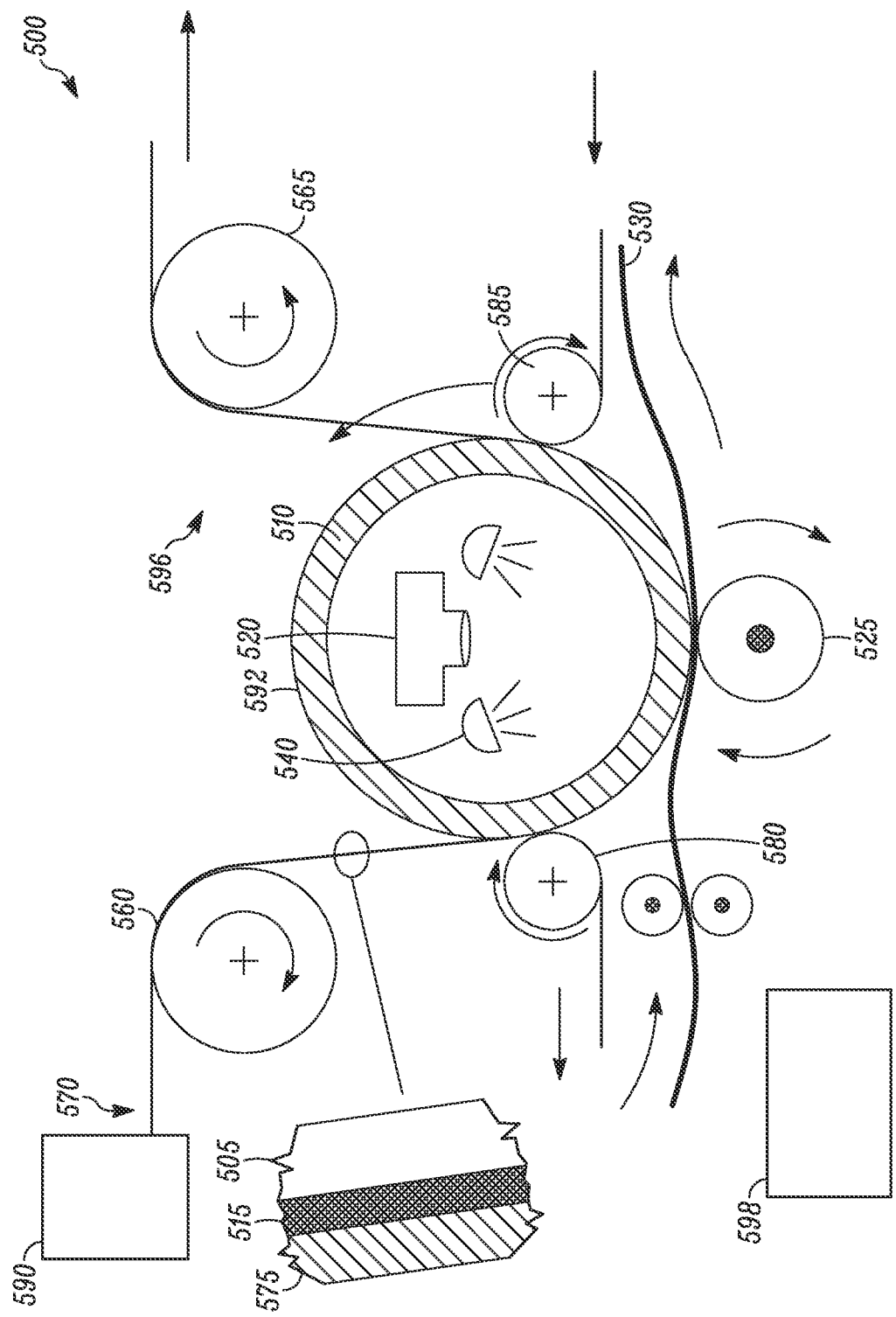
FIG. 5 shows a side view of a tactile rolling sensor with a continuously fed web of a sensing membrane.

FIG. 5 shows a side view of a tactile rolling sensor 500 with a continuously fed web material 570 that incorporates elements of the sensing membrane such as an elastomer and a reflective surface. The tactile rolling sensor 500 may be similar to the sensor 400 described above and may include a clear rigid cylinder 510 inside of which is mounted a camera 520 and directed illumination 540. The tactile rolling sensor 500 may have rollers 560 and 565 that are used to feed and remove a multi-layer sensing membrane, which may be provided as a web material 570 between the cylinder 510 and an object 530 to be inspected. The sensor 500 may also includes a roller 525 configured to press a target surface of an object 530 such as a sheet of material or other object against the web material 570 to provide an impression of the target surface in the web material 570. This may include hardware to press the roller 525 with a predetermined contact force such as a particular contact force or a maximum or minimum contact force. This may also or instead include hardware to press the roller 525 with a predetermined contact angle or angle of contact force, such as by pressing at a particular angle or with a minimum or maximum force angle. Controlling the deflection forces at the moment of contact may reduce shearing of the object surface and other imaging artifacts related to the mechanical coupling of the web material 570 to the target surface such as trapping of air bubbles, tearing of the reflective material, and so forth.

The roller 525 may include a drive wheel to drive an object 530 such as a sheet of material through the sensor 500 for continuous measurement. In other embodiments, the drive wheel 525 can be replaced with a conveyor or other handling system as generally described above, or the roller 525 may otherwise be adapted, e.g., to accommodate objects such as large, rigid objects that might usefully be conveyed through the sensor 500 for surface measurements. In one aspect, the roller 525 may also accommodate z-axis deflection so that an object of substantially varying height can be continuously measured. As the roller 525 deflects away from the web material 570 to accommodate greater height or thickness of the object, the deflection may be measured and included in a three-dimensional model of the object formed from multiple measurements or samples.

The web material 570 may include a reflective membrane 515 joined to a clear elastomer 505. The reflective membrane 515 may be further joined to a release liner 575. The release liner 575 may provide structural support for the elastomer 505 and membrane 515, both of which are flexible, as they are being conveyed to the cylinder 510. The release liner 575 may also usefully protect the surface of the reflective membrane 515. The release liner 575 may be constructed of any commercially available release liners, for example, the 5002 Secondary Liner made by 3M (St. Paul, Minn.). As the web material 570 is passed between an outer surface of the cylinder 510 and a roller 580, the release liner may be removed from the elastomer and reflective membrane composite. After contacting a surface of interest on the object 530, the elastomer and reflective membrane composite may pass between the cylinder and a roller 585. Where the web material 570 is disposable, the web material may be directly fed to a disposal unit or the like. Where the web material 570 is intended for reuse, the roller 585 may optionally rejoin a release liner 575 onto the web material 570 for subsequent handling and reuse. A layer of clear elastomer may also or instead be disposed on the outside surface of the cylinder 510, with the web material 570 providing a reflective coating of the sensing composite, which is disposed on a sidewall 592 of the cylinder 510 and removed after imaging as described above.

In another aspect, the roller 580 or a similar structure may be configured as an applicator to apply the reflective material to the web material 570 as a reflective ink or the like, or to apply the reflective material as a reflective coating from a release liner or the like to the clear elastomer in the web material 570.

A source 590 of the web material 570 may be provided to supply the web material 570 to the sensor 500. The source 590 may include any suitable spool, spooling system, or other handling system for feeding a sheet of web material such as the web material 570 to a process in a controlled manner. This may, for example, include tensioning control, speed control, positional control, and so forth as desired to maintain the web material 570 in a desired state in the imaging process. In general, the web material may include an elastomeric material adapted to conform to an object during contact, such as any of the elastomers described herein. The web material 570 may also or instead include a reflective material, such as any of the reflective materials described herein.

More generally, a spooling system 596 may be formed of any of the rollers, the source 590, the cylinder 510 and other components described herein to draw the web material 570 from the source 590 through the roller 525, and away for further processing or disposal. For example, the spooling system may be configured to move the web material 570 along the surface of a clear pressure fixture to facilitate replacement of a portion of the web material 570 (also referred to herein simply as a "web") adjacent to the target surface. In this manner, new web material 570 may be continuously provided for continuous imaging. In an embodiment such as that described below with reference to FIG. 9, the spooling system 596 may further draw the web material 570 to an imaging system physically separated from the roller 525, with an impression of the target surface carried in the web material 570 for subsequent imaging by the imaging system.

A controller 598 may be included to control operation of the sensor 500 and related hardware. The controller 598 may include a processor or any other processing circuitry configured to perform the various control functions described herein. For example, the controller 598 may include a processor or other processing circuitry configured to obtain a three-dimensional image using a number of images obtained by an imaging such as any of the imaging systems described herein, e.g., to calculate the three-dimensional image based on three-dimensional data encoded in one or more images of the target surface captured by the camera 520. The controller may also or instead include a processor similarly configured to obtain a surface gradient or a normal map for a target surface, which may be obtained from a single image or from a combination of a number of overlapping images obtained using any of the continuous imaging techniques described herein.

Figure 6:
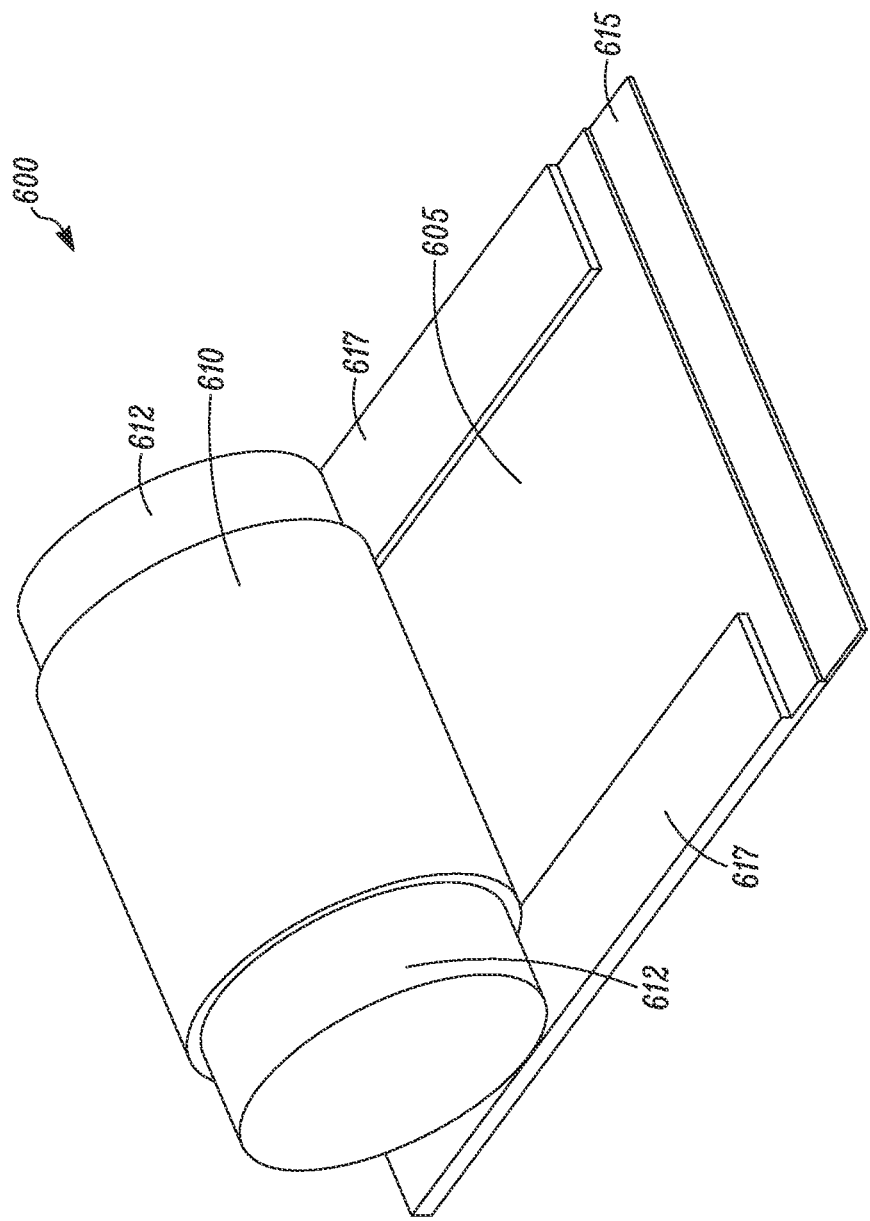
FIG. 6 is a perspective view of a pressure cylinder and a composite web material.

FIG. 6 shows a perspective view of an imaging system 600 using a pressure cylinder and a web material that provides a continuous sensing membrane. The web material may be a composite material including a reflective membrane 615 joined to a clear elastomer 605. To provide additional strength to the otherwise relatively fragile reflective membrane and elastomer composite, strips of a structural material 617 may be joined to the elastomer 605 running along the length of the composite. The structural material 617 may be a flexible and non-stretchy material, such as, but not limited to, polyester. The cylinder 610, which may be any of the rigid, clear cylinders described herein, may be modified with recessed portions 612 aligned to the structural material 617 in the composite web material. These modifications can be in place of or in addition to the support film 455 and/or release liner 575 described above.

Figure 7:
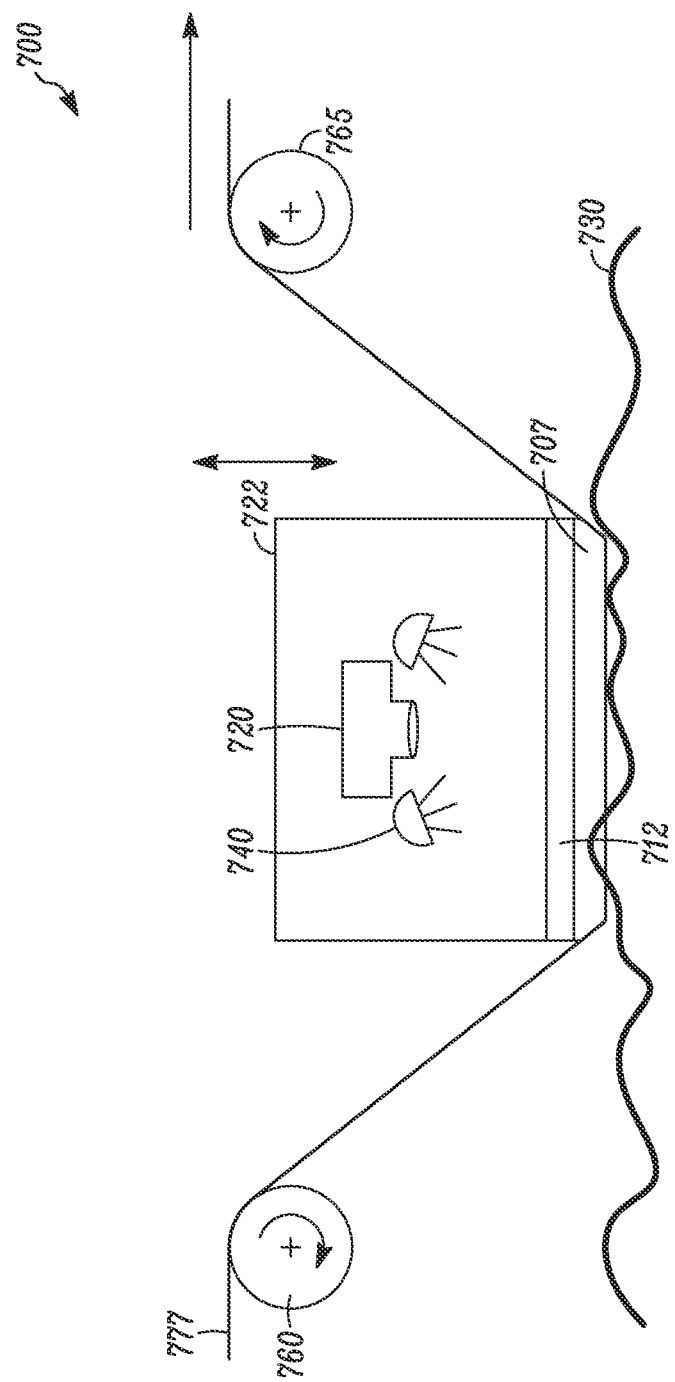
FIG. 7 shows a side view of a tactile sensor with a non-rolling pressure plate.

FIG. 7 shows a side view of an implementation of a tactile sensor 700 with a non-rolling pressure plate. The tactile sensor 700 may include a pressure fixture 712 such as a clear pressure plate that provides a planar surface for impressing an object 730 into a web 777 of sensing material. The pressure fixture 712 may be attached to a movable support structure 722. A clear elastomer 707 may be joined to the pressure fixture 712, or bonded to the web 777. A camera 720 and directional illumination 740 may be disposed inside the frame of the support structure 722 and serve the purposes described above. The sensor 700 may also or instead use a composite web according to any of the embodiments described herein as the web 777. The web 777 may be held taut across a surface of the clear pressure plate 712 by rollers 760 and 765, and/or may be pressed against the object 730 by moving the pressure fixture 712 or the object accordingly.

The support structure 722 and pressure plate 712 may be moveable in at least a direction towards and away from an object 730. When the support structure and plate are disposed away from the object 730, a reflective membrane of the web 777 may move out of contact with the object 730 and when the support structure and plate are moved toward the object, the reflective membrane of the web 777 may be moved into contact with a portion of a target surface of the object 730 for making measurements of the target surface. The camera 720 and directional illumination 740 may move with the support structure 722 or may remain stationary during movement of the structure 722.

In order to measure a relatively large surface of the object 730 (e.g., larger than the a processing mesh of the sensor 700) or in order to continuously measure a surface of an object 730, the object 730 may be moved in steps as the support structure 722 and pressure plate 712 are cycled towards and away from the object 730. This generates a series of images that can be combined into a single image of the entire surface of interest of the object 730 by methods known in the art, such as those used to obtain panoramic photographs from a series of smaller photographs. The support structure 722 can have any of a number of shapes, including, but not limited to, a stationary half cylinder, a polygon with flat surfaces, or a rectangle with rounded edges. Optionally, a lubricant such as an oil may be provided to lubricate the outside surface of the pressure fixture 712 that is in contact with the web 777 so that the web 777 can slide more easily across the pressure fixture 712. The oil may be an index matching oil to match an index of refraction of the pressure fixture 712 and/or the elastomer 707.

The movement of the object 730 and the web 777 can be matched so that an entirely fresh portion of web 777 comes into contact with a new portion of the surface of the object 730. In other words, if a conveyor advances the object 20 cm, then rollers 760 and 765 may feed 20 cm of new composite membrane into contact with the pressure plate 712. In other implementations, portions of the composite membrane are reused a number of times. For example, although the conveyor advances the object 20 cm, rollers 760 and 765 may only fed about 2 cm of fresh web 777 into contact with the pressure plate 712. In this manner, the entire contact surface may be refreshed every 10 samples. It will be understood that these numbers are examples only, and that any suitable ratio of incremental advancement of the web 777 relative to the object 730 may be suitable employed according to, e.g., the cleanliness of the object 730, the durability of the web 777 and any other factors. Further, portions of the surface of interest of the object 730 may be imaged multiple times. For example, if the entire assembly is able to detect 20 cm of length of the object 730 per image, then the conveyor can advance the object 10 cm each image cycle in order to provide two images for each portion of the object 730.

A controller such as any of the controllers described herein may be configured to operate a spooling system for the web 777 to replace apportion of the reflective material on the web 777 between consecutive measurements of a target surface by scrolling the web to position an unused portion of the web between the pressure fixture 712 and the target surface of the object 730. In general, the controller may be configured to replace a portion of the reflective material and/or web 777 or the entire surface after each measurement, or the controller may replace some or all of the surface after a predetermined number of surface measurements.

As noted above, the pressure fixture 712 may be movable along an axis toward and away from the object 730 as necessary or helpful to facilitate repositioning of the object 730 for continuous imaging.

Figure 8:
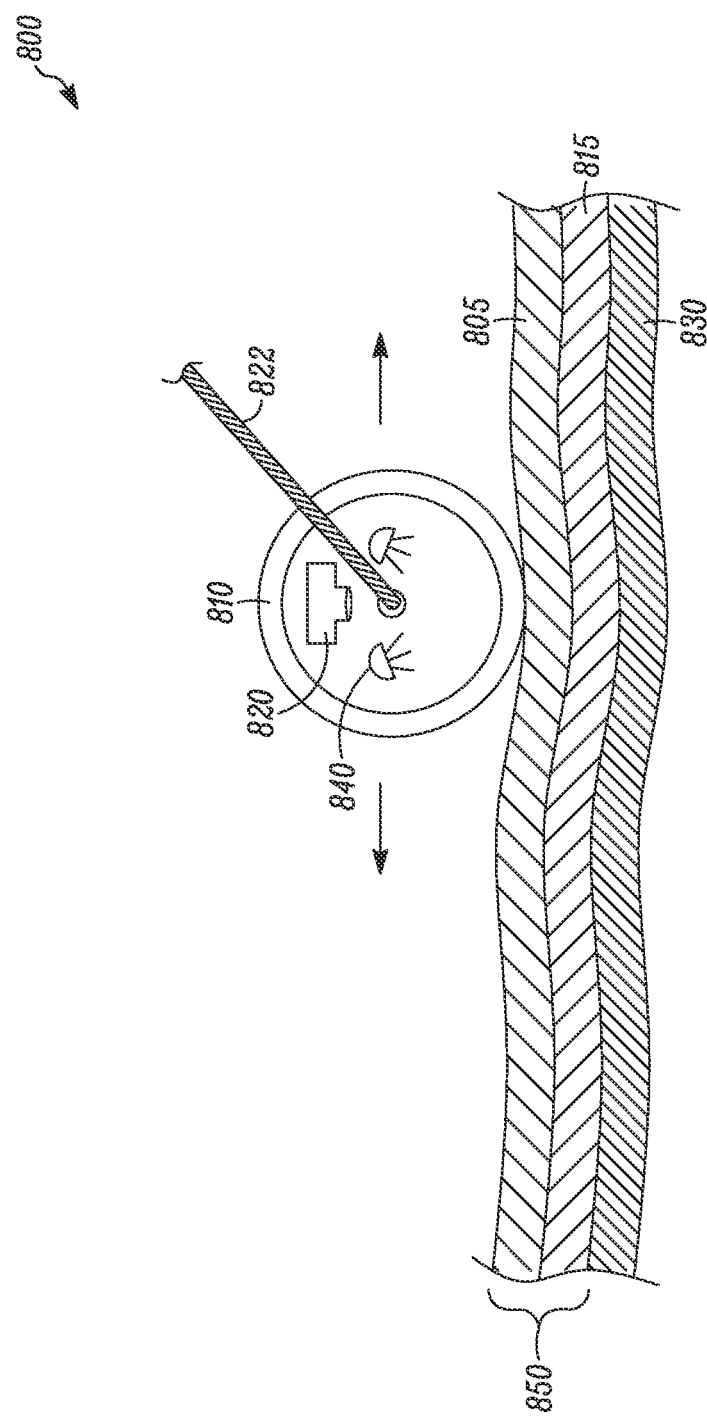
FIG. 8 shows a side view of a tactile sensor with a stationary sample surface and sensor membrane.

FIG. 8 shows a side view of a tactile sensor 800 with a stationary sample surface and sensor membrane. The tactile sensor 800 may include a clear rigid cylinder 810 inside of which is mounted a camera 820 and directed illumination 840. The cylinder 810 and associated internals (roller assembly) may be joined to an arm 822 that supports the cylinder 822 and enables the cylinder 822 to be moved about over a surface of a sensing membrane 850 in contact with an object 830. In this embodiment, the object 830 may be held stationary along with the sensing membrane 850. The sensing membrane 850 may be a multi-layer composite that is placed on a surface of interest of an object 830 before contacting the membrane with the roller assembly. The sensing membrane 850 may include a reflective membrane 815 joined to a clear elastomer 805. The joining can be accomplished with a clear adhesive.

After the sensing membrane 850 is placed in contact with the surface of interest of the object 830, the roller assembly may be passed over the surface. The series of images gathered during the scanning operation can be assembled into a single image in accordance with known stitching techniques. They sensor 800 may include a rotary encoder or the like to track rotation of the cylinder so that image capture can be synchronized to movement over the object and overlapping images can be obtained for subsequent combination into an aggregated three-dimensional model or the like.

Figure 9:
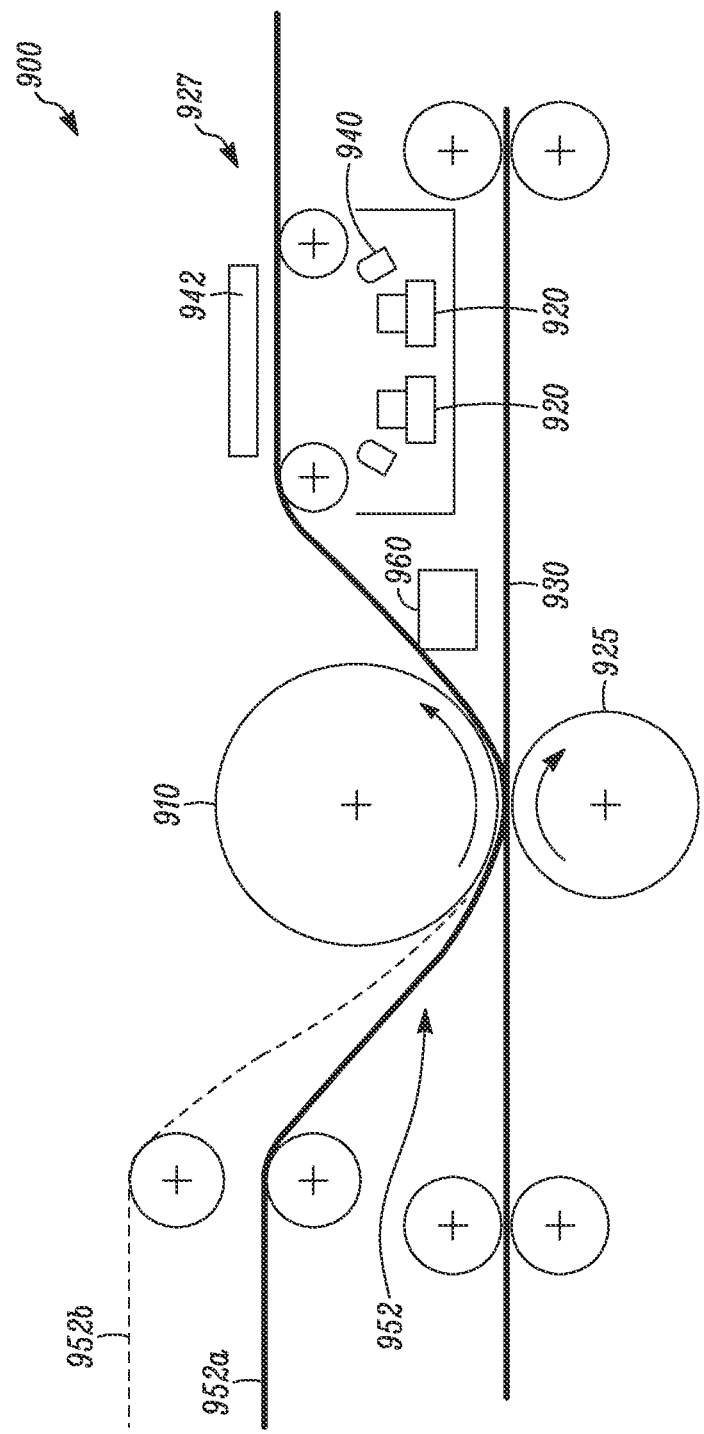
FIG. 9 shows a side view of a tactile sensor with a non-elastomeric sensing structure.

FIG. 9 shows a side view of an implementation of a tactile sensor 900 with a web material 952 forming a non-elastomeric sensing structure. The web material 952 may be a material that forms an impression of a surface onto which it is pressed and then cures, thereby preserving the impression. For example, certain RTV silicones (such as those commercially available from Dow Corning), UV-cure silicones (such as those commercially available from Wacker Chemie), and/or casting materials (such as ReproRubber® Metrology Casting Material commercially available from Flexbar of Islandia, N.Y.) are suitable for this use. A target surface of an object 930 may be contacted by the web material 952 as the structure and object 930 pass between a rigid cylinder 910 and a roller 925. As the web material 952 and the object 930 contact the cylinder 910, an impression of the target surface may be formed in the web material 952.

After the impression is formed, the web material 952 may pass through an optical sensor assembly 927. The optical sensor assembly 927 may include at least one camera 920 and directed illumination 940. The camera 920 may detect the light reflected from the surface of the web material 952 and, thereby, gather an image of the impression of the target surface in the web material 952. Optionally, the web material 952 can be semi-transparent and can be illuminated from a backlight 942 rather than directed illumination 940. In this case, the shape of the impression can be generated by measuring the relative opacity of portions of the impression. As the impression is the photonegative of the surface of interest, known techniques can be used to determine the photopositive image.

In one implementation, the web material 952 need not be curable, or need not fully cure. Instead, the surface of the web material 952 bearing the impression of the surface of interest may pass to the imaging system without contacting any rollers, and with sufficient speed that the impression is fully retained within the web material 952. Optionally, rollers and/or wheels may be sized and positioned to only contact the outer edges of the sensing structure 952 which bear no portion of the impression.

In other implementations, two materials may be brought together to form the web material 952 before it contacts the surface of interest. For example, a web of a base material 952a and a web of a catalyst material 952b may be combined to initiate curing before contacting the surface of interest, such as while the materials 952a, 952b are fed from a source such as any of the sources described herein. The speed of the roller 925 (which may also include a drive wheel to provide a driving force for the web material 952) may be set according to a contact time required for the web material 592 to cure sufficiently to retain an impression of the target surface.

Optionally, when using other curable web material 952, a curing system 960 (such as an ultraviolet light source for an ultraviolet curable web material 952) may be provided adjacent to the point of contact between the web material 952 and the target surface, or at any other suitable location to cure the web material 952 before, during, or after contact with the target surface. In general, the curing system 952 may be configured to cure the web material 52 in a manner that permits the web material to retain an impression as the web material passes from the roller 925 to the imaging system 927.

Although the figure shows two sheets being brought together to initiate curing, one of skill in the art, upon reading this disclosure, would understand that other techniques, such as static mixers, may be employed for mixed curing materials, and that other sheets of web material such as release liners, structural support materials, and so forth may also or instead be used.

A controller such as any of the controllers described herein may be used to position an impression in the web material 952 within a field of view of the camera 920, and to control an imaging system such as the optical sensor assembly 927 to capture one or more images of the impression in the web material.

Figure 10:
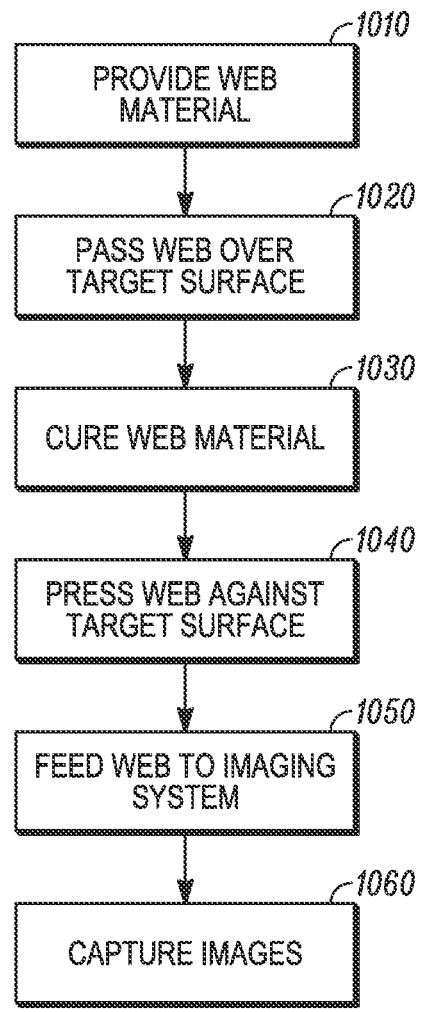
FIG. 10 shows a flow chart of a method for continuous imaging.

FIG. 10 is a flow chart of a method for continuous imaging. In particular, FIG. 10 shows a method in which a web material continuously captures an impression of a target surface and carries the impression to an imaging system. It will be understood that the method 1000 below may use any of the devices and components thereof described herein, and that the method 1000 may be modified to accommodate operation of any of the imaging techniques and systems described above.

As shown in step 1010, the method 1000 may begin with providing a source of web material including an elastomeric material adapted to conform to an object during contact. Where a reflective surface is to be used for three-dimensional imaging as contemplated herein, the web material may also include a thin, opaque, reflective material on a side of the web material facing the target surface. However, useful images of an impression may also or instead be captured simply by illuminating an opaque impression, or by backlighting a semi-transparent web material as described herein. In one aspect, providing web material may include forming a composite laminate such as by laminating multiple layers of material or by applying an ink or the like as a reflective material to a substrate of a clear elastomer to form the web material.

As shown in step 1020, the method 1000 may include continuously passing the web material over a target surface such as a surface of an object to be measured. This may include using any spooling system, source of web material, or other handling system(s) described herein.

As shown in step 1030, the method 1000 may include curing the web material. The web material may be any curable material which may be wholly or partially cured before, during, or after contact with a target surface in order to better retain an impression after contact with the target surface, such as while the web material is transferring the impression to an imaging system. Where the web is formed by lamination immediately prior to use, this may include forming the web material by laminating a web of a base material and a web of catalyst to initiate curing of the base material by the catalyst. In this manner, curing may be initiated by the lamination process immediately prior to contact with a target surface.

As shown in step 1040, the method 1000 may include applying a force to press the web material onto or into the target surface, thereby creating an impression of the target surface in the web material. This may include the use of rollers, a pressure plate, a tensioned, clear support film, or any other suitable technique for obtaining an impression in the web material of the target surface. It will be understood that a continuous impression may be obtained using, e.g., a rolling, clear, cylindrical pressure fixture, or a number of sequential impressions obtained with a pressure plate that presses and releases the web material to stamp portions of the target surface into the web material, or using any other suitable techniques.

As shown in step 1050, the method 1000 may include feeding the web material from the target surface to an imaging system.

As shown in step 1060, the method 1000 may include capturing an image of the impression. This may include capturing a three-dimensional image from one or more images of the impression in the web material, such as by using the directed illumination of a reflective surface as described herein to capture surface normals that can be used to calculate a three-dimensional image. This may also or instead include backlighting the impression through a semi-transparent web material and using light intensity to infer shape of the impression. More generally, any suitable technique for capturing two-dimensional images, three-dimensional images, or other representative data such as a normals map or surface gradient may also or instead be used.

The various embodiments and implementations of the invention described above may be modified in various ways and remain within the scope of the invention. For example, the rolling cylinders described above may be replaced with a polygonal roller having a number of flat portions that contact areas of the surface of interest in sequence as the object passes and each flat portion is "rolled" onto the oncoming portion of the object. In addition, the reflective membrane can be entirely opaque or can include alternating opaque and clear portions that enable the sensor systems described above to measure surface features as well as surface texture and color.

In a specific implementation of the tactile sensor 700, the length of the opaque and reflective portion of the membrane is the same as the length of the clear portion of the membrane. Furthermore, the object and composite membrane (with the alternating opaque and clear portions) are moved relative to each other and to the camera so that the camera takes one image of a portion of the surface through the clear portion of membrane and the camera takes a second image of the same portion of the surface in contact with the opaque portion of the membrane. In this way, such a sensor measures the topology, texture, and color of the entire object.

In still further embodiments, the camera described above can be an array of cameras placed relatively close to the reflective membrane near the point the membrane contacts the surface of the object. The cameras can be arranged so that their images slightly overlap, and these images can be combined into a single large image by standard stitching techniques. In other implementations, a Contact Image Sensor, or CIS, replaces the cameras described above. A CIS is a linear array of lenses and photo sensors placed in close proximity to the reflective membrane. In such a case, no image forming lens is required.

The various physical properties and/or design parameters of the elastomer, reflective membrane, illumination source(s), and photosensing structure(s) can be varied as set forth in the incorporated applications. Likewise, the embodiments described here can be used to generate information to reconstruct the 3-D shape of the deformed surface of the reflective membrane, and, therefore, the surface of interest of the object. For example, optical techniques such as the use of multiple-camera systems, laser scanning, structured light (e.g., projector/camera systems), and/or other photometric stereo techniques may be used.

Many of the above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory, any of which may serve as the controller described above or supplement processing of the controller with additional circuitry. This may also, or instead, include one or more application specific integrated circuits, programmable gate arrays, programmable array logic components, or any other device(s) that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. Thus, the order or presentation of method steps in the description and drawings above is not intended to require this order of performing the recited steps unless a particular order is expressly required or otherwise clear from the context. Further, the method steps of the invention(s) described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
   a source of a web material on a supply roller, the web material being a deformable sensing matrix including a reflective layer on a first side of an elastomeric material, the elastomeric material adapted to conform to an object during contact with the reflective layer, and the deformable sensing matrix including a clear support structure less malleable than the elastomeric material on a second side of the elastomeric material opposing the first side;
   a roller configured to press a target surface of the object against the deformable sensing matrix, thereby providing an impression of the target surface in the web material;
   an imaging system including a camera with a field of view and a light source configured to illuminate the field of view;
   a spooling system configured to draw the deformable sensing matrix from the supply roller and continuously feed the web material through the roller and over the target surface to a membrane collection roller so that every measurement of the target surface is taken with an unused portion of the deformable sensing matrix;
   a conveyor to move the object past the roller at a predetermined distance with a planar movement of the target surface matched to a movement of the web material in order to trap and feed the object between the conveyor and the reflective layer of the web material while maintaining the target surface in contact with the web material; and
   a controller configured to operate the spooling system to position the impression within the field of view of the camera and to capture one or more images of the impression in the deformable sensing matrix using the imaging system.

2. The device of claim 1 wherein the roller presses the target surface against the web material with a predetermined contact force.

3. The device of claim 1 wherein the roller presses the target surface against the web material with a predetermined contact angle.

4. The device of claim 1 wherein the light source is configured to provide a grazing illumination of the impression.

5. The device of claim 4 wherein the camera captures a plurality of images, each one of the images illuminated with the grazing illumination from a different direction.

6. The device of claim 1 wherein the web material is a curable material.

7. The device of claim 1 further comprising a curing system configured to cure the web material in a manner that permits the web material to retain the impression as the web material passes from the roller to the imaging system.

8. The device of claim 1 further comprising a processor configured to obtain a three-dimensional image using the one or more images.

9. The device of claim 1 further comprising a processor configured to obtain at least one of a surface gradient and a normal map for the target surface.

10. The device of claim 1 further comprising a light source positioned to illuminate the impression in the field of view.

11. The device of claim 1 wherein the web material includes a silicone.

12. The device of claim 11 wherein the silicone is an ultraviolet light curable silicone.

13. The device of claim 12 further comprising an ultraviolet light source positioned to cure the web material along a path from the source to the imaging system.

14. The device of claim 1 wherein the web material includes a web of a base material and a web of a catalyst combined to initiate curing as the base material and the catalyst are provided from the source.

15. The device of claim 1 wherein the web material is semi-transparent, the imaging system further comprising a back light to illuminate the web material from a surface opposite the camera.

16. The device of claim 1 wherein the web material is a composite material including a clear elastomer on a first side away from the target surface and an opaque, reflective material on a second side adjacent to the target surface.

17. The device of claim 16 wherein the composite material includes a clear support film positioned on a side of the clear elastomer opposing the opaque, reflective material.

18. The device of claim 1 wherein the roller and the source of the web material are configured to continuously capture an impression as the target surface passes the roller.

19. A method comprising:
providing a source of a web material, the web material being a deformable sensing matrix including an elastomeric material adapted to conform to an object during contact, a reflective layer disposed on a first side of the elastomeric material, and a clear support structure less malleable than the elastomeric material disposed on a second side of the elastomeric material opposing the first side;
continuously passing the web material from the source over a target surface of the object with the reflective layer in contact with the target surface and to a membrane collection roller while moving the object with a conveyor so that every measurement of the deformable sensing matrix is taken with an unused portion of the deformable sensing matrix;
applying a force to the clear support structure with a roller to press the web material onto the target surface, thereby creating an impression of the target surface in the reflective layer of the web material;
moving the object past the roller at a predetermined distance with a planar movement of the target surface matched to a movement of the web material in order to trap and feed the object between the conveyor and the reflective layer of the web material while maintaining the target surface in contact with the web material;
feeding the web material from the target surface to an imaging system; and
capturing an image of the impression.

20. The method of claim 19 wherein the web material is a curable web material, the method further comprising curing the web material to retain the impression after contact with the target surface.

\* \* \* \* \*